Dec. 5, 1967 B. J. SCHRAMM ET AL 3,356,153
ROTOR BLADE
Filed Aug. 19, 1966
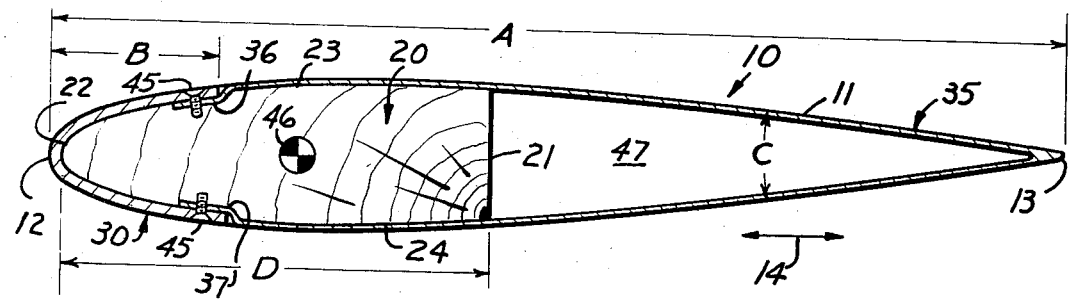
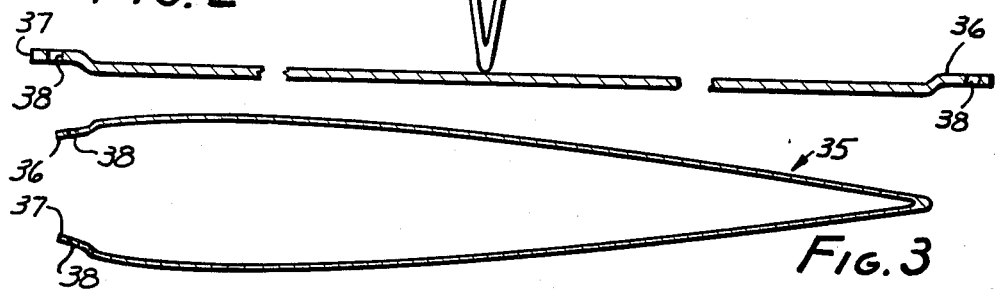
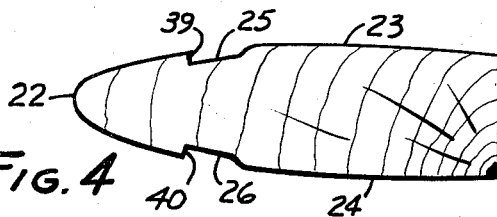
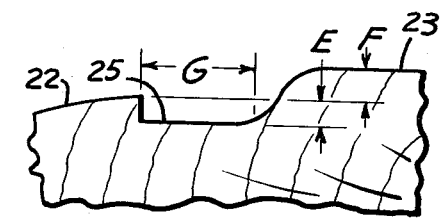
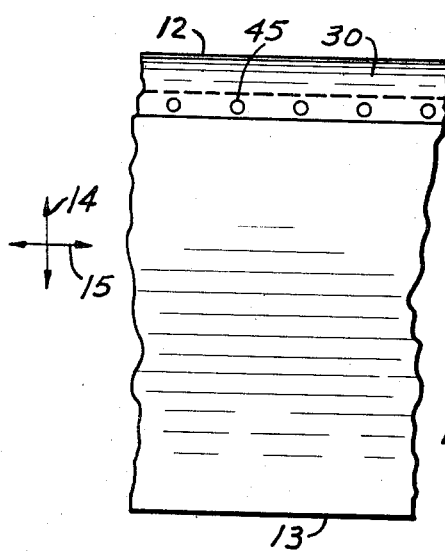
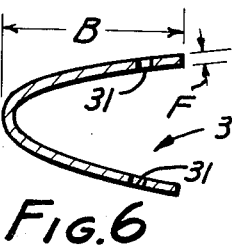
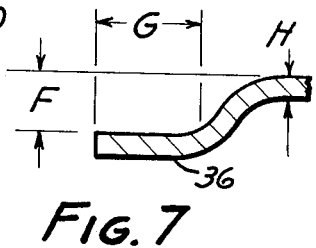
INVENTORS
BUFORD J. SCHRAMM,
ROBERT G. EVERTS
BY
Angus & Mon
ATTORNEYS.

United States Patent Office 3,356,153
Patented Dec. 5, 1967

3,356,153
ROTOR BLADE
Buford J. Schramm, 115 N. Primrose, Alhambra, Calif. 91801, and Robert G. Everts, Inglewood, Calif.; said Everts assignor to said Schramm
Filed Aug. 19, 1966, Ser. No. 573,690
6 Claims. (Cl. 170—159)

This invention relates to a rotor blade for helicopters.

Rotor blades for helicopters involve complications not shared by conventional fixed airfoils. They must, like other airfoils, have and retain a suitable shape in order to provide lift and control. However, because of the cyclic nature of their operation, they are especially subject to torsional effects, which effects if permitted to occur, are unfavorable to control of the aircraft. As is well known, except when the aircraft is going straight up, each blade goes through a cyclical rotation around its lateral axis each revolution, and unless these are compensated by equal and opposite angular reactions on each blade, the control deteriorates. The torsional effect is contradictory to this desired control, and it is therefore quite essential that these long and relatively flexible blades, while permitting bending in a vertical plane, still should not be permitted to twist especially near the tips where their speed is the fastest. There are other problems involved such as resistance to fatigue in the presence of strong centrifugal forces, and the need for safety in the event of progressive failure. Also, they need to be as light as possible, and their center of gravity needs accurately to be positioned. Furthermore, because of their velocities and operation in proximity to the ground, they must be relatively immune to abrasion and blows on the leading edge.

The comments above are especially applicable to helicopters in which the blades are powered. The problems do not arise in devices such as autogyros, although this blade is useful in autogyro applications.

The attainment of the above objectives for a rotor blade has long been attempted, and numerous blade designs have been made, most of which have resulted in blades which, while serviceable, still include more compromises and degradation of performance than one would wish.

It is an object of this invention to provide a simple rotor blade made of a minimum number of pieces with a suitable airfoil configuration, torsional stiffness, properly located center of gravity, abrasion resistance on the leading edge, markedly enhanced fatigue properties, and simplicity of construction and manufacture.

A helicopter blade according to this invention has an airfoil surface including a leading edge and a trailing edge. The blade has a forward axis extending between the edges and a lateral axis extending generally parallel to them. The blade includes a solid spar member which extends laterally for the length of the blade, this spar member including a supporting surface which is generally geometrically similar to a respective portion of the desired airfoil shape. Two grooves, one atop and one beneath the spar member are formed in the spar member to receive a leading cladding member and a rear foil member at which grooves these members are attached in overlaying relationship to each other and to the spar member, thereby joining these three pieces into an integral blade with a substantially uninterrupted surface. The rear foil member comprises a single continuous bent piece of metal, and the leading cladding member is a bent channel of airfoil shape contiguous to the spar and made of material having a greater specific gravity than that of the spar member so as in part to counterbalance the weight of the rear foil member, and to have an enhanced resistance to abrasion.

A method of making a blade of this type comprises forming the spar with an external surface geometrically similar to at least a portion of the desired airfoil shape and forming a pair of spaced-apart grooves in the surface thereof. The method further comprises bending a single piece of metal to form a rear foil shape having a pair of laterally extending joggles adapted to fit into the said grooves. The method further involves forming a channel made of material of specific gravity greater than that of the spar member so as to form the airfoil configuration on the leading edge and laying it over the leading edge of the spar and the joggles of the rear foil member and then joining the three members together at the two grooves.

The invention will be fully understood from the following detailed description and the accompanying drawings in which:

FIG. 1 is a cross section taken on the forward axis showing the presently preferred embodiment of the invention;

FIG. 2 shows two operations in the formation of the rear foil member;

FIG. 3 is a cross section showing the product of a third operation which completes the rear foil member;

FIGS. 4 and 5 are cross sections showing the spar member in detail;

FIG. 6 is a cross section showing the leading cladding member in detail;

FIG. 7 is a fragmentary cross section of a portion of FIG. 3; and

FIG. 8 is a fragmentary top elevation of FIG. 1.

As shown in FIG. 1, a blade 10 according to the invention has an outer airfoil configuration 11 which may take any desired shape. For purposes of illustration of this invention the airfoil shown is an NACA .0015, and the dimensions given are those for manufacturing this airfoil. However, the method of building the wing and its construction are suitable for other airfoil constructions as well.

The device has a leading edge 12 and a trailing edge 13 with a forward axis 14 extending between them and a lateral axis 15 extending generally parallel to them (see FIG. 8). Rotation of the blade is around the center either to the right or to the left of FIG. 8 depending on the direction of rotation.

A spar member 20 comprises a solid piece of material extending for substantially the full length of the blade. It may be made of any suitable material such as wood, wood laminates, aluminum alloys and the like. It is continuous and uniform, but not necessarily homogeneous. The terms "continuous" and "uniform" contemplate laminates, while "homogeneity" does not. It the device shown it has been found that aircraft grade birch wood is a suitable material for the spar member.

The spar member includes a rear face 21 and first, second and third portions 22, 23, 24, which are geometrically similar to at least a portion of the airfoil surface which surface is, of course, defined by materials which overlay the spar member. First portion 22 is the leading portion, and portions 23 and 24 are the top and bottom portions respectively. First and second grooves 25, 26 are formed extending laterally in the spar member, atop and beneath the spar member. The depth of the grooves will later be discussed. These grooves are identical.

A leading cladding member 30 is contiguous with the first portion of the spar member. It is formed as a channel to closely embrace this portion and its outer surface is that of the desired airfoil shape at the leading edge. A plurality of holes 31 are drilled in rows along the top and bottom edges of the leading cladding member.

A rear foil member 35 is formed at the trailing edge. It is a generally V-shaped channel with a first and a second joggle 36, 37 respectively, which joggles fit into the bottoms of the first and second grooves 25, 26 and extend laterally. The two joggles are identical. Holes 38 are formed in the joggled portions in a line with holes 31. The joggles seat on the bottom of the respective grooves which end at shoulders 39, 40 in abutment with the ends of the joggles and the joggles are overlaid by the free edges of the leading cladding member. Fasteners 45 which are preferably screws, adapted to firmly attach to the material of the spar member, are passed through holes 31 and 38 and firmly join the three bodies together in an overlaying relationship. If desired, bonding materials such as 3M Scotch Weld structural adhesive are laid on portions 22, 23 and 24 and on both sides of the joggles so as to bond the structure together, in addition to, or instead of, the fasteners, the term "fastening means" comprehending both bonding agents and mechanical fasteners. The preferred structure provides a continuously bonded structure which is further joined together by fasteners at spaced apart locations.

The center of gravity 46 is shown in its relative position. Void 47 is shown inside the trailing foil member which void may be left vacant if desired or, should balance or additional strength be desired, may be filled by foam or any other material. The presently preferred embodiment leaves the void without a filling material.

The spar member is made of material strong enough to withstand the centrifugal forces of the blade, and the fatigue forces, although it is strongly reinforced by the leading cladding member and the rear foil member, the device being a continuous composite structure which is strongly resistant to torsion. The spar material is selected for resistance to fatigue failure and may be such as aircraft grade birch wood or the like; in fact in the preferred embodiment, the material is aircraft grade spruce wood. The material for the leading cladding member is selected for having a higher specific gravity than the material for the spar member and also for its resistance to abrasion. The presently preferred embodiment is 4130 alloy steel. The material of the rear foil member is selected in general for lightness of weight and the presently preferred material is 5052H32 aluminum alloy.

A table of suitable dimensions to construct the NACA .0015 foil is as follows:

Dimensions:
| | | |
|---|---|---|
| A | inches | 7.50 |
| B | do | 1.25 |
| C | | 17° |
| D | inches | 3.25 |
| E | do | 0.032 |
| F | do | 0.090 |
| G | do | 0.300 |
| H | do | 0.032 |

The center of gravity 46 is located 25% rearwardly of the leading edge.

This blade is conveniently constructed as follows. The spar member is cut off to its proper length and is either chemically or machine milled to the shape shown by forming surfaces 22, 23 and 24 and grooves 25 and 26. Leading cladding member 30 is formed in a press to the shape shown in FIG. 6.

The rear foil member is formed by taking a continuous sheet of substantially the length of the spar member and forming joggles 36 and 37 on each end as shown in FIG. 2. Then the device is folded as shown in FIG. 2 to form angle C. Thereafter the device is formed as shown in FIG. 3 by bending it either on a form or directly on the spar member to include the curvature of portions 23 and 24. The portions 22, 23, and 24 are covered with bonding agent as are both surfaces of joggles 25 and 26. Then the rear foil member is laid in the position as shown in FIG. 1. Next the leading cladding member is placed over the joggles, contiguous with portion 22, after which the fasteners 45 are put in place. The adhesive is cured and the blade is ready for use.

This blade makes a torsionally rigid, light weight and reliable device. The rear foil member, should the blade begin to fail in fatigue, will show its condition before deterioration has significantly proceeded anywhere else. The blade is characterized as being essentially a continuous structure either with or without the bonding material. It will function with fasteners alone or with bonding alone. With both it is even more reliable. The center of gravity is moved forward by virtue of the greater specific gravity of the leading cladding member as compared with the material of which the spar member is manufactured. In destruction tests, this device has been shown to be strong, and in operation to be flutter free, and fatigue and torsion resistant.

This invention is not to be limited by the embodiment shown in the drawings and described in the description which is given by way of example and not of limitation but only in accordance with the scope of the appended claims.

We claim:

1. A rotor blade having a leading edge, a trailing edge, a forward axis joining the edges, a lateral axis extending generally parallel to the edges, and an airfoil contour, said rotor blade consisting of: a wooden, homogenous and continuous spar member extending laterally for substantially the full length of the blade, said spar member having a curved first portion, at its leading edge and a second and third portion on each side of said first portion, a laterally extending groove between the first and second portions and between the first and third portions, a metallic, unitary and continuous rear foil member comprising a channel extending laterally for substantially the full length of the blade, and overlaying the second and third portions, a joggle on each laterally-extending free edge of the rear foil member seated in a respective one of the grooves, the rear edge of the rear foil member being spaced axially rearwardly of the spar member, a metallic, unitary and continuous leading cladding member in full service abutment with the first portion of the spar member and overlaying both of said joggles, the leading cladding member having a substantially uniform thickness and a greater specific gravity than the material of which the spar member is made, the outer surfaces of the cladding and rear foil members forming a substantially continuous joint without a ridge, and fastening means at said grooves joining the members together, the leading cladding member having an outer airfoil surface, the first portion of the spar member having a geometrically similar surface reduced in dimension by the thickness of the leading cladding member, the full area of the first portion of the spar member being in full and continuous surface contact with the leading cladding member.

2. A second rotor blade according to claim 1 in which the first and second and third portions are bonded to those parts of the other members which are contiguous thereto.

3. A rotor blade according to claim 1 in which the fastener means comprises screws.

4. A rotor blade according to claim 3 in which the first, second and third portions are bonded to those parts of the other members which are contiguous thereto.

5. A rotor blade according to claim 1 in which the region bounded by the rear foil member and the spar member is empty of other structure.

6. A rotor blade according to claim 1 in which the spar member is a continuous structure.

References Cited

UNITED STATES PATENTS

| | | | |
|---|---|---|---|
| 2,470,056 | 5/1949 | Seibel | 170—159 |
| 2,596,818 | 5/1952 | Meyers | 170—159 |
| 2,694,458 | 11/1954 | Stevens | 170—159 |
| 3,055,437 | 9/1962 | Stack | 170—159 |
| 3,237,697 | 3/1966 | Ford et al. | 170—159 |

MARTIN P. SCHWADRON, *Primary Examiner.*

EVERETTE A. POWELL, Jr., *Examiner.*

UNITED STATES PATENT OFFICE

CERTIFICATE OF CORRECTION

Patent No. 3,356,153                          December 5, 1967

Buford J. Schramm et al.

It is hereby certified that error appears in the above numbered patent requiring correction and that the said Letters Patent should read as corrected below.

Column 2, line 57, for "It" read -- In --; column 4, line 8, for "25 and 26" read -- 36 and 37 --; line 40, for "portion," read -- portion --; line 66, strike out "second".

Signed and sealed this 18th day of February 1969.

(SEAL)
Attest:

Edward M. Fletcher, Jr.                         EDWARD J. BRENNER
Attesting Officer                                 Commissioner of Patents